(12) United States Patent
Vargas et al.

(10) Patent No.: US 11,685,856 B2
(45) Date of Patent: Jun. 27, 2023

(54) BRANCHED POLYETHYLENEIMINE (B-PE) AS OILFIELD METAL NAPHTHENATE INHIBITORS

(71) Applicant: Baker Hughes Oilfield Operations LLC, Houston, TX (US)

(72) Inventors: Jonathan Vargas, Sugar Land, TX (US); Joey Dacula Mangadlao, Agusan del Sur (PH)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/327,412

(22) Filed: May 21, 2021

(65) Prior Publication Data

US 2022/0396725 A1 Dec. 15, 2022

(51) Int. Cl.
*C09K 8/528* (2006.01)

(52) U.S. Cl.
CPC .................. *C09K 8/528* (2013.01)

(58) Field of Classification Search
CPC .................. C09K 8/528; Y10S 507/929
See application file for complete search history.

(56) References Cited

U.S. PATENT DOCUMENTS

| | | | |
|---|---|---|---|
| 5,252,254 A | 10/1993 | Babian-Kibala | |
| 6,103,100 A * | 8/2000 | Hart | C10G 9/16 208/47 |
| 8,003,574 B2 | 8/2011 | Debord et al. | |
| 2012/0178804 A1 * | 7/2012 | Bottcher | A01N 47/12 514/478 |
| 2018/0326118 A1 * | 11/2018 | Oscarson | A61P 7/02 |

* cited by examiner

*Primary Examiner* — Aiqun Li
(74) *Attorney, Agent, or Firm* — Crowe & Dunlevy, P.C.

(57) ABSTRACT

Relatively low molecular weight, branched polyethyleneimine (B-PE), a specific class of polyamine, has been shown to be effective at inhibiting the formation metal naphthenate precipitate (MNP) in systems and fluids that include an organic phase and an aqueous phase where the system or fluid further contains metal ions and tetra acid, and in particular the addition of low molecular weight, B-PE molecules prevents the formation of metal naphthenate precipitates/deposits in the fluids. Inhibition of alkali earth metal naphthenates (e.g. calcium naphthenate) and alkali metal naphthenates (e.g. sodium naphthenate) are particular non-limiting embodiments.

13 Claims, 12 Drawing Sheets

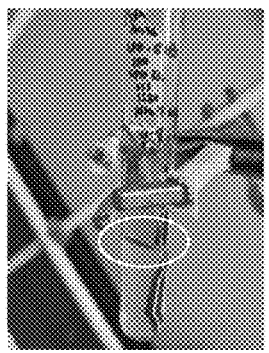
FIG. 33
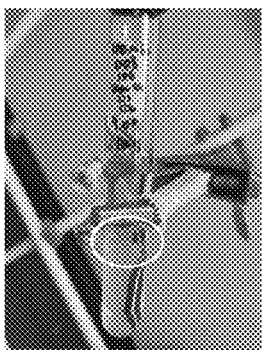
FIG. 34
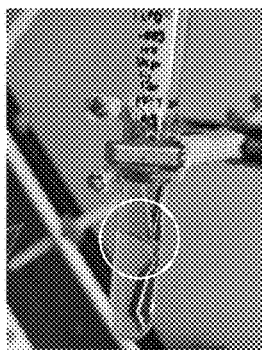
FIG. 35
FIG. 36
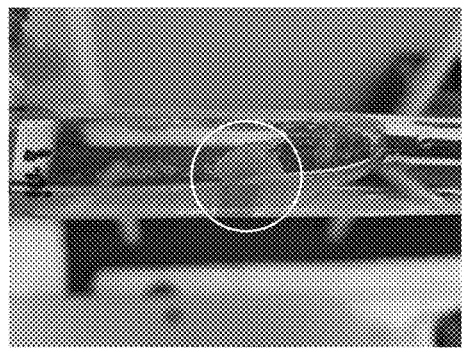

BRANCHED POLYETHYLENEIMINE (B-PE) AS OILFIELD METAL NAPHTHENATE INHIBITORS

TECHNICAL FIELD

The present invention relates to methods and compositions for inhibiting the formation of solids in fluids, and more particularly relates, in one non-limiting embodiment, to methods and compositions for inhibiting the formation of metal naphthenate precipitates solids are larger, aggregate form of precipitates to form deposits in oilfield fluids having an aqueous phase and an organic phase.

TECHNICAL BACKGROUND

It is widely known in the art that the processing of crude oil in its various fractions has led to damage of the iron-containing metal surfaces of associated apparatus due to naphthenic acid corrosion. It is also known that corrosion is not the only problem associated with the production, handling, and processing of crude oils having high levels of naphthenic acid. Naphthenic acids can also interact with metals, particularly calcium and sodium, to form metal naphthenate precipitates and emulsions. The metal precipitates can agglomerate to form solids, which can increase in size to form deposits that can block strainers and other equipment downstream from oil wells.

One method of treating naphthenic solids known to the art is to acidify production fluid as it leaves the well bore. It is known to use acetic acid and mineral acids for this process. One disadvantage of using acids at this stage of production is the cost of the acids, which may be required at high treatment levels. Another concern the use of acid base chemistries can lead to severe corrosion within the production system and in some instances poor water clarity. Some of these acids are dangerous and can pose safety hazards.

In more detail, and in a non-limiting embodiment, the formation of calcium naphthenates precipitate (CNP) in the oilfield is driven by three criteria: pH, free calcium, and naphthenic acid, specifically ARN Acid (AA), also known as a tetra acid. When the pH is above the pKa of the AA this favors a deprotonated state and increase the interfacial activity; in the non-restrictive case of calcium naphthenate this pH is 5.49. This results in the AA residing at the oil/water interface and interacting with free calcium from the water phase, resulting in the formation and continue growth of the CNP over time resulting in plugging of pipes, water separators, and formation of insoluble solids.

U.S. Pat. No. 5,252,254 discloses that sulfonated alkylphenol can be added to crude oil at 5 to 200 ppm to inhibit naphthenic acid corrosion of ferrous metal process piping and equipment in contact with the crude oil at naphthenic acid corrosion conditions. There are disclosed corrosion-inhibited hydrocarbon fluids, an improvement in hot hydrocarbon processing with sulfonated alkylphenol, a method for inhibiting naphthenic acid corrosion therewith, and a method for catalytically processing hydrocarbons with sulfonated alkylphenol to avoid catalyst poisoning by iron compounds.

Naphthenic acid solids and/or emulsions can be inhibited by introducing an additive to crude oil prior to or concurrent with the deprotonation of the naphthenic acids present in the crude oil, according to U.S. Pat. No. 8,003,574 to Baker Hughes. The additives may be surfactants and can be amines, quaternary ammonium compounds, quaternary phosphonium compounds, and mixtures of both. The additives may also be linear compounds having at least two carboxylic acid or acrylic acid functional moieties. This patent in particular seeks to avoid forming an ARN layer, which is defined as a "plastic-like" layer that forms at the interface of the organic and brine solutions, which can be strongly indicative of calcium naphthenate. The formation of an ARN layer or lack therefore provides a very good visual clue as to the inhibition activity of the added product. These inhibitors are non-acid.

It would be desirable in the art to mitigate or eliminate naphthenic acid solids formation downstream and or at any point as within the production system or equipment though not limited to without resorting to the use of acetic mineral acid treatment, or any acid derived chemistry. It would be desirable if new methods and compositions of CNP inhibitors could be discovered which are very effective, particularly as compared with conventional inhibitors, such as quaternary ammonium compounds.

SUMMARY

There is provided in one non-limiting embodiment a method for inhibiting the formation of metal naphthenate in a fluid that includes an aqueous phase and an organic phase, where the fluid also includes metal cations and tetra acid, where the method involves contacting the fluid with an amount of a branched polyethyleneimine (B-PE) effective to inhibit the formation of metal naphthenate in the fluid, where the B-PE has a molecular weight in a range from 150-2000 g/mol, and inhibiting the formation of metal naphthenate in the fluid.

There is additionally provided in one non-restrictive version, a treated fluid that includes an aqueous phase that includes metal cations, an organic phase that includes tetra acid, and a branched polyethyleneimine (B-PE) effective to inhibit the formation of metal naphthenate in the treated fluid, where the B-PE has a molecular weight in a range from 150-2000 g/mol.

BRIEF DESCRIPTION OF THE DRAWINGS

FIG. 33 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that when 100 ppm of B-PE was introduced that oil/water interface was clean;

FIG. 34 is a photograph of a biphasic bottle screening test with a field synthetic brine phase of 1000 ppm $CaCl_2$ and a pH of 8.01 ($NaHCO_3^-$) and an organic phase of 1:20 tetra acid in xylene of a 50/50 vol. % ratio organic/brine showing that when 100 ppm of B-PE was introduced that oil/water interface was clean;

FIG. 35 is a photograph of a biphasic bottle screening test with a field synthetic brine phase of 2000 ppm $CaCl_2$ and a pH of 8.01 ($NaHCO_3^-$) and an organic phase of 1:20 tetra acid in xylene of a 50/50 vol. % ratio organic/brine showing that when 100 ppm of B-PE was introduced that oil/water interface was clean;

FIG. 36 is a photograph of a biphasic bottle screening test with a field synthetic brine phase of 2000 ppm $CaCl_2$ and a pH of 8.01 ($NaHCO_3^-$) and an organic phase of 1:20 tetra acid in xylene of a 50/50 vol. % ratio organic/brine showing that when no PEI was introduced (blank) that CNP formed at the oil/water interface;

DETAILED DESCRIPTION

Figure 1:
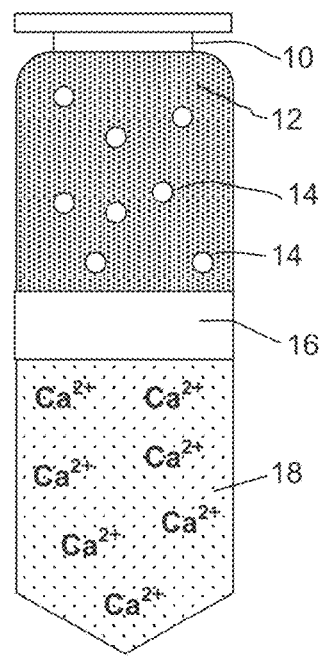
FIG. 1 is a schematic diagram of a biphasic bottle screening test illustrating a bottle with an oil phase containing tetra acid, an oil/water interface, and a bulk water phase containing $Ca^{2+}$ ions.

The present invention relates to branched polyethylenimines (B-PE) delivered into production fluids comprising oil and water such as within a hydrocarbon producing formation and or production-processing system. The B-PE described here are shown to inhibit the interaction of free metal cations, such as calcium, with tetra acid, that is also known as ARN Acid. Due to the inherent makeup (primary, secondary, tertiary amines) of B-PE and structural architecture, B-PE have a high cationic charge density. In one non-limiting explanation, the cationic nature of B-PE allows the interaction/complexation with anionic compounds that reside in either the bulk hydrocarbon and aqueous phase in addition at the oil/water interface. This complexation process removes naphthenic acids and/or organic acids from oil/water interface thus preventing the interaction of tetra acid and the metal ions (e.g. calcium ions) with the consequent formation of calcium naphthenate precipitates and or deposits.

In particular, it has been surprisingly discovered that B-PE in a particular molecular weight range can inhibit the formation of metal naphthenate precipitates (MNP) and in particular calcium naphthenate precipitates (CHP) in fluids that contain an aqueous phase and an organic phase, where the fluid is a basic fluid, or alkaline fluid, that also contains calcium and tetra acid. As will be demonstrated, the B-PE may have a weight average molecular weight in a range from 200-2000 g/mol in one non-limiting embodiment. B-PE of higher molecular weight, such as 2200 g/mol is not effective because normally they are too hydrophilic to partition into the organic phase.

In one non-limiting embodiment, the fluid contains metal cations which form metal naphthenate precipitates (MNPs) when the metal cations contact tetra acid. In one non-restrictive version, the metal cations are metal dications and/or metal monocations. Further, in a different embodiment, the metal cations include alkali metal monocations including, but not necessarily limited to, sodium and/or potassium, as well as alkali earth metal dications including, but not necessarily limited to, magnesium, calcium, strontium, vanadium and/or barium. In another non-limiting embodiment, the methods and compositions herein may also be effective for inhibiting other metal naphthenate, such as, but not necessarily limited to, sodium naphthenates, iron naphthenates, and copper naphthenates though not limited to just these metal naphthenates.

The treated fluid may be an emulsion or other mixtures or combinations of an organic phase and an aqueous phase. The combination may be as simple as an organic phase over an aqueous phase, or may be as complex as a bicontinuous emulsion, and may include both water-in-oil (w/o) emulsions and (o/w) oil-in-water emulsions. The water in the fluid can be brine or may be water without salt—that is, not brine. The organic phase can be a wide variety of organic liquids including, but not necessarily limited to, crude oil from any source, hydrocarbon from any source, and petroleum phase from any source and the like.

Tetra acid is also known as ARN acid, which in turn is sometimes abbreviated as "AA". The "tetra" name comes from the fact that such acids typically have four or more carboxylic acid sites. In one non-limiting embodiment, ARN acid can be understood to be a family of 4-protic carboxylic acids containing 4-8 unsaturated sites (rings) in the hydrocarbon skeleton with mole average mole weights in the range 1227-1235 g/mol, although the molecular weight is not specific to this range. Tetra acid naturally forms due to the breakdown of oil, a metabolic product of Archaea microorganisms. The source of the oil will dictate the molecular range. In at least one case, the range can be much wider and in other cases, the molecular weight of tetra acid falls in line with the stated definition above.

In one non-limiting embodiment the aqueous phase is in the basic or alkaline pH range. In another non-restrictive version, the pH of the aqueous phase ranges from about 7 independently to about 9; alternatively from about 7 independently to about 8.5; and in another non-limiting embodiment from about 7.5 to about 8. As defined herein with respect to ranges, the term "independently" means that any threshold may be combined with any other threshold to give a suitable alternative range. For example from about 7 to about 8 is a suitable pH range (pH>5.49 will facilitate the formation of CNP, 5.49 is the pKa of the carboxylic acid), in a specific, non-limiting embodiment.

Figure 2:
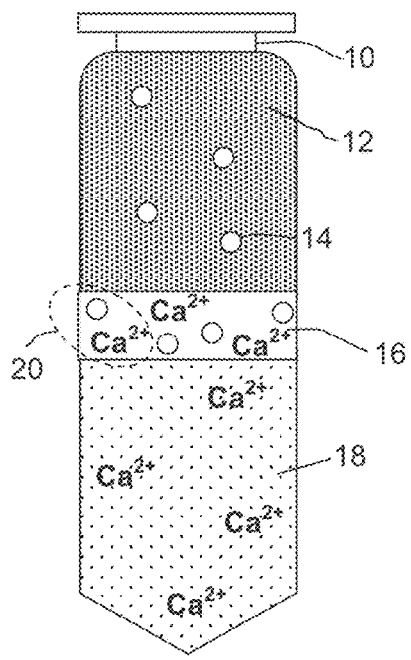
FIG. 2 is a schematic diagram of the biphasic bottle screening test of FIG. 1 after a time lapse where the tetra acid and the $Ca^{2+}$ ions have complexed in the oil/water interface to form a calcium naphthenate precipitate (CNP)
Figure 3:
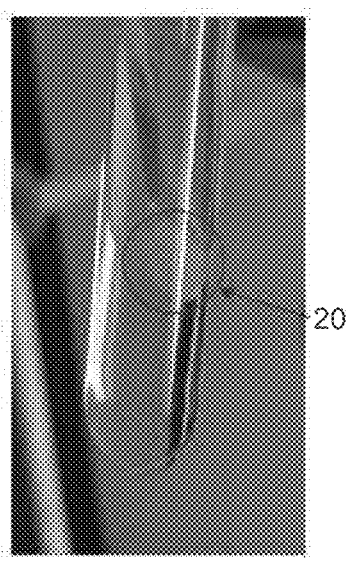
FIG. 3 is a photograph of a biphasic bottle screening test showing CNP at the oil/water interface as schematically illustrated in FIG. 2.

The fluid also contains calcium, and in one non-limiting embodiment the aqueous phase in the fluid contains $Ca^{2+}$ cations. One non-limiting explanation for the formation of CHP can be understood with respect to FIGS. 1 and 2. FIG. 1 is a schematic diagram of a biphasic bottle screening test illustrating a bottle 10 with a bulk oil (organic) phase 12 containing tetra acid 14, over an oil/water interface 16, and a bulk water (aqueous) phase 18 containing $Ca^{2+}$ ions. The pH of the bulk water phase is greater than the pKa of the tetra acid. The concentration of tetra acid 14 in the bulk oil phase 12 is known. Over time, the tetra acid 14 migrates to the oil/water interface 16 and complexes with the $Ca^{2+}$ ions to form CNP 20 at the interface 16 as shown in FIG. 2. There is a loss of tetra acid from the bulk oil phase 12 to the oil/water interface 16. FIG. 3 is a photograph of a biphasic bottle screening test showing CNP 20 at the oil/water interface as schematically illustrated in FIG. 3 in the circle.

Figure 4:
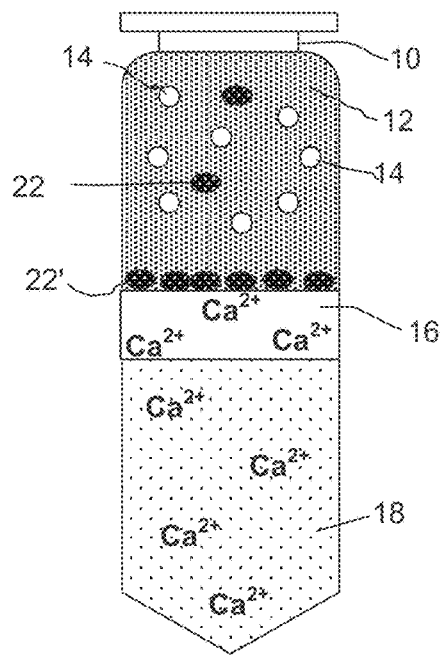
FIG. 4 is a schematic diagram of a biphasic bottle screening test illustrating a bottle with an oil phase containing tetra acid and an inhibitor product, an oil/water interface containing $Ca^{2+}$ ions but free of tetra acid and thus free of CNP, and a bulk water phase containing $Ca^{2+}$ ions illustrating one possible non-limiting mechanism for the method described herein.
Figure 5:
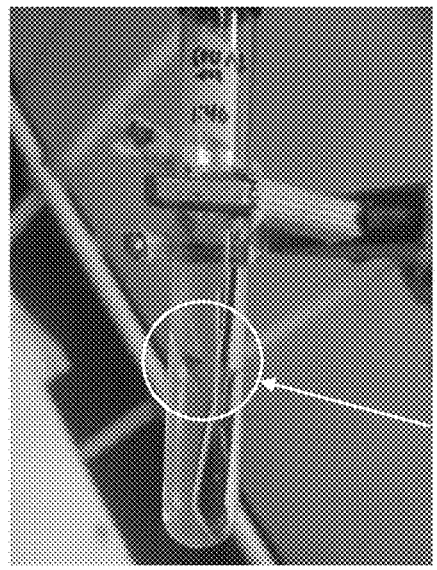
FIG. 5 is a photograph of a biphasic bottle screening test showing no CNP at the oil/water interface as schematically illustrated in FIG. 4.

There are a number of possible explanations or mechanisms for the efficacy of the branched PEI (B-PE) to inhibit CNP from precipitating. A non-limiting explanation is given with respect to FIG. 4, which is a schematic diagram of a biphasic bottle screening test illustrating a bottle with an oil phase 12 containing tetra acid 14 and an inhibitor product 22, an oil/water interface 16 containing, $Ca^{2+}$ ions but free of tetra acid and thus free of CNP 20, and a bulk water phase 18 containing $Ca^{2+}$ ions, as discussed above with respect to FIGS. 1 and 2. An inhibitor product 22, i.e. the B-PE described herein has been added to the fluid. It is acceptable for the B-PE to be added either to the organic phase 12, oil/water interface 16 or to the aqueous phase 18, but the B-PE 22 in many cases will have an affinity for organic phase 12, e.g. oil phase. One non-limiting mechanism is that the inhibitor product 22, which is interfacially active, creates a barrier/film 22' that inhibits or prevents the tetra acid 14 from crossing the oil water interface 16 to complex with the $Ca^{2+}$ ions as schematically illustrated in FIG. 4. The result is as shown in the photograph of FIG. 5 of a biphasic bottle screening test showing no CNP at the oil/water interface.

Figure 6:
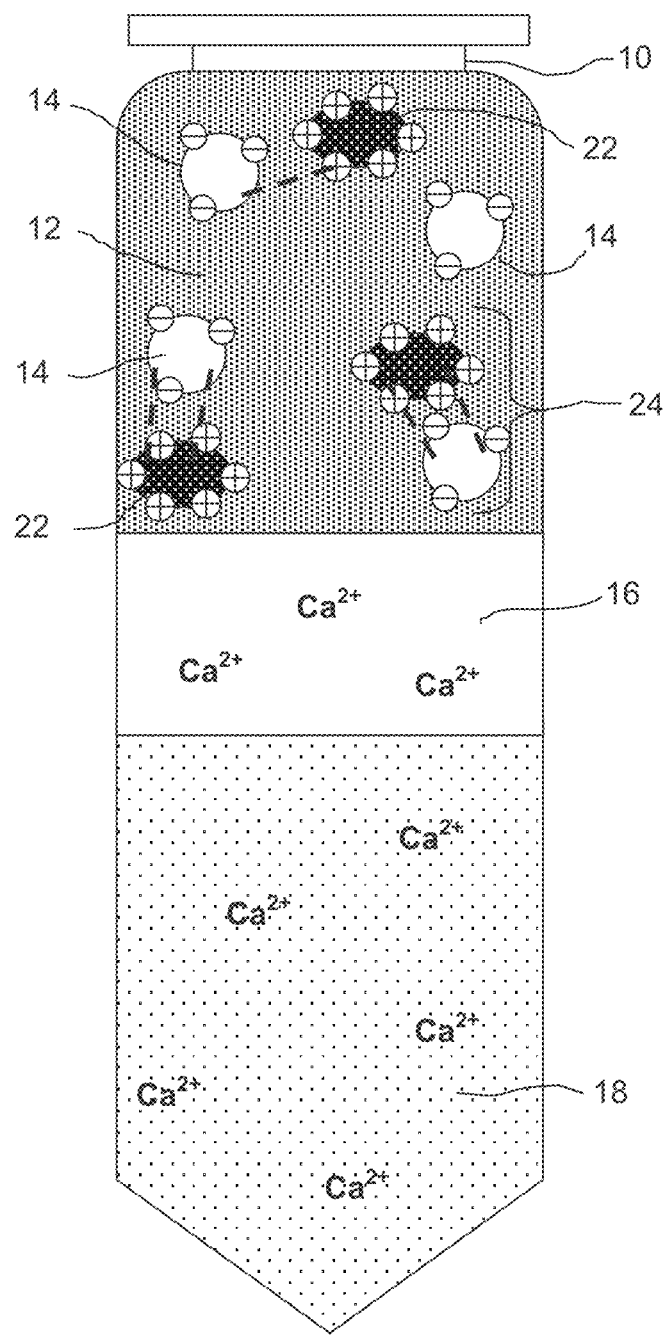
FIG. 6 is a schematic diagram of a biphasic bottle screening test illustrating a bottle with an oil phase containing tetra acid and an inhibitor product, an oil/water interface containing $Ca^{2+}$ ions but free of tetra acid and thus free of CNP, and a bulk water phase containing $Ca^{2+}$ ions illustrating a second possible non-restrictive mechanism for the method described herein.

In a different, non-limiting possible explanation or mechanism for the effectiveness of the method described herein, FIG. 6 presents a schematic diagram of a biphasic bottle screening test illustrating a bottle 10 with an oil phase 12 containing tetra acid 14 and an inhibitor product 22, an oil/water interface 16 containing $Ca^{2+}$ ions but free of tetra acid 14 and thus free of CNP, and a bulk water phase 18 containing $Ca^{2+}$ ions. It should be noted that a goal is no change in the bulk tetra acid concentration through the chemical inhibition. When B-PE is in a water phase 18 of pH less than 10.5, the B-PE is in a cationic charged state. The non-charged state is schematically illustrated by Formula 1 below; the charged state is schematically illustrated by Formula 2 below. Note that for a pH between 5.01 to 10.49, all primary and secondary amines are protonated, providing multiple positive charges on the B-PE.

The charged state of the B-PE allows it to complex with the anionic carboxylate (pH>pKa) of the tetra acid preventing the migration to the oil/water interface 16. This is schematically illustrated by the tetra acid 14 having negative charges of an anionic state, represented by the ⊖ symbols, and the B-PE inhibitor 22 having positive charges of a cationic state, represented by the ⊕ symbols. In this non-limiting explanation, ionic complexation between the B-PE 22 and the tetra acid 14 give complexes 24 as shown by the black dashed lines, which complexes 24 inhibit interaction with Ca2+ dications and consequent formation of CNP.

Figure 7:
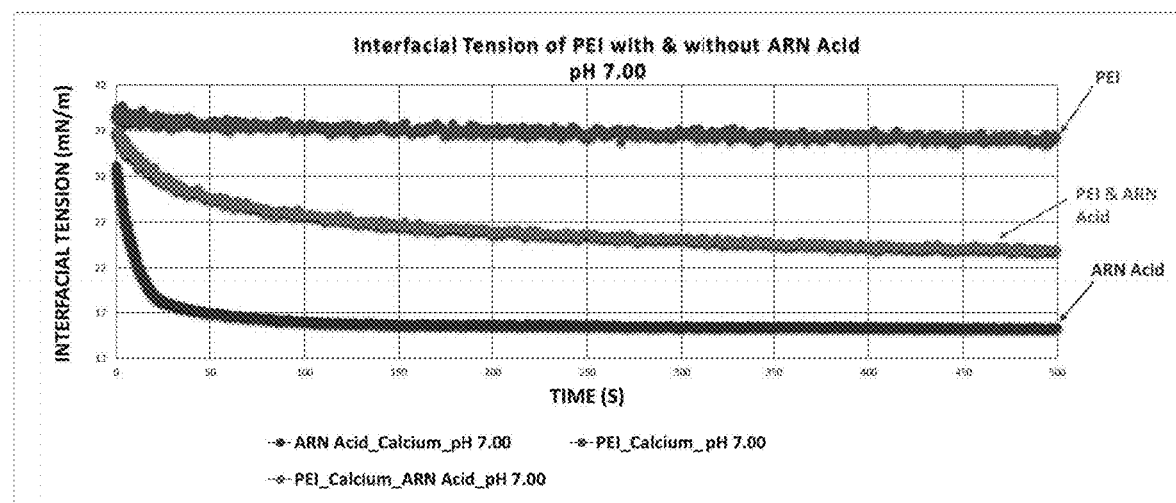
FIG. 7 is a graph of interfacial tension (IFT) of B-PE with and without tetra acid as well as tetra acid alone.

An alternative non-limiting mechanism or explanation involves interfacial tension (IFT). An incumbent or commercial product is a quaternary amine surfactant which lowers IFT. In contrast, B-PE has relatively high IFT which may cause the B-PE to couple, complex, or otherwise somehow bind up the tetra acid to prevent or inhibit the tetra acid from moving to or collecting at the oil/water interface. This possible mechanism is illustrated in FIG. 7, which is a graph of IFT as a function of time. In these data, xylene is the organic phase. The lower curve is for tetra acid (AA) alone showing low IFT. B-PE has high IFT, as shown in the top curve. Xylene by itself has a high IFT, although not as high as this top curve for B-PE (xylene curve not shown). When B-PE is present together with tetra acid, the IFT is intermediate. This behavior suggests that in the protonated state B-PE complexes with the tetra acid in the bulk organic phase and or the oil/water interface. Protonated B-PE has an affinity for the organic phase; it then complexes with the tetra acid forming complexes that change their interfacial properties, which reinforces the previous possible explanation.

Another non-limiting explanation or mechanism is that the B-PE acts as an agglomeration threshold inhibitor; that is, it inhibits crystalline grown of the CNPs. In other words, the PEI may act as a sort of dispersant or kinetic inhibitor analogously to a kinetic hydrate inhibitor (KHI).

It is possible that more than one of these mechanisms may be at work at the same time, or there may be one or more other mechanisms also working.

The B-PE can be schematically illustrated as Formula 1, but it will be appreciated that B-PE does not necessarily have this exact structure. Formula 1 is simply representative. As previously mentioned, Formula 2 is a non-limiting representation of protonated B-PE of the Formula 1 representative structure. The PEI is highly branched, and as previously mentioned, has been surprising found must be in a relatively low molecular weight range. In one non-limiting embodiment, the weight average molecular weight ranges from about 150 independently to about 2000 g/mol; where alternatively the upper threshold may be 1800 g/mol, 1700 g/mol, or 1600 g/mol. Different suitable molecular weight ranges include from about 200 independently to about 1350 g/mol; in another non-restrictive form from about 300 independently to about 1200 g/mol; and in a different non-limiting embodiment from about 400 independently to about 1100 g/mol.

In another a non-limiting embodiment, it is expected that the use of a co-solvent may help disperse B-PEs with higher molecular weights than those mentioned above into the organic phase. B-PEs with molecular weights higher than 2000 g/mol have too much affinity for water and not enough affinity for an organic phase; B-PEs with molecular weights below 150 g/mol tend to not have enough charges to permit inhibition.

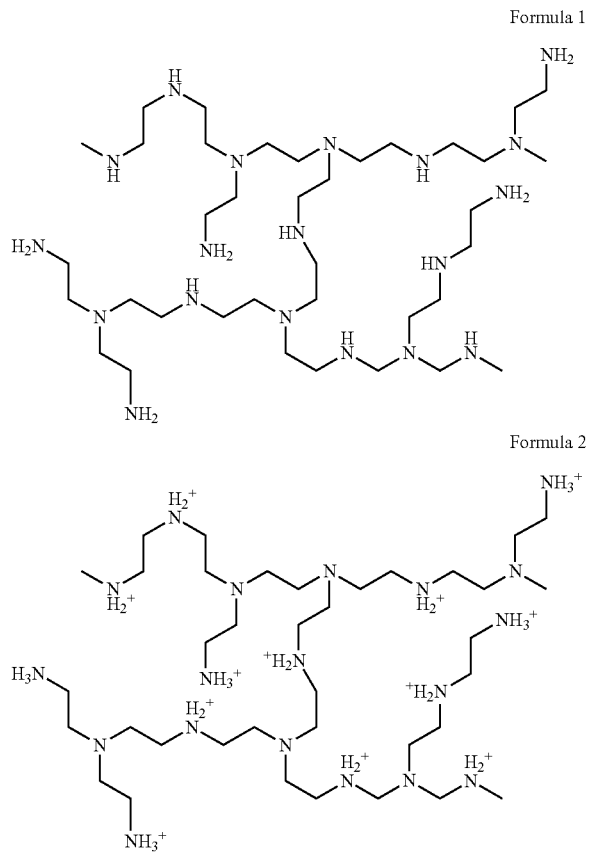

Formula 1

Formula 2

It has also been discovered that for the method described here where PEI is the CNP inhibitor that the effectiveness of the PEI in the fluid is independent of the amount of calcium present in the aqueous fluid, which is not the case for commercial quaternary ammonium inhibitors. The effective amount of B-PE is dependent on the amount of tetra acid present in the fluid and the pH of the aqueous phase of the fluid. The aqueous phase may have a pH in the range of about 5.49 independently to about 10.49; alternatively from about 6 independently to about 8.8; in another non-restrictive version from about 6.5 independently to about 8.6; in a different version 5.49 independently to about 6. In a further non-limiting embodiment the effective amount of the B-PE ranges from about 2.5 ppm independently to about 50 ppm, based on wt./wt. of the tetra acid present; alternatively from about 5 independently to about 45 ppm; in another non-restrictive embodiment from about 8 independently to about 40 ppm. As will be established, it has also been surprisingly discovered that less of the B-PE may be used to give the same inhibiting effect on CNP as compared with the commercial quaternary ammonium inhibitor for otherwise identical fluids. In one non-limiting embodiment, for a fixed concentration of tetra acid, if the pH increased to 8, there would have to be an increase in the amount of B-PE. In other words, with more deprotonation, more B-PE is needed. In many cases, it is expected that a pH of around 6 will be typical; rarely is the pH as high as 8.

In most expected applications, it is expected that there will be sufficient mixing so that it does not matter into which phase the B-PE is introduced. In some embodiments, if there is a choice, it is more efficient to introduce the B-PE into the organic phase. In a non-limiting example, in a static separator, the organic phase and the aqueous phase will separate over time when quiescent. Thus, it would be convenient to introduce the PEI into the organic phase, e.g. the oil phase.

The invention will now be illustrated with respect to certain examples which are not intended to limit the invention in any way but simply to further illustrate it in certain specific embodiments. Percentages are weight percentages unless otherwise noted.

EXAMPLES

In all of the Biphasic Bottle Screening Tests described below, after introduction of the noted components into a test tube, the test tubes were inverted three times and then centrifuged before the noted observations. In all of FIGS. 6-40, the white circle concentrates attention on the CNP present, or the lack of CNP present.

Figure 8:
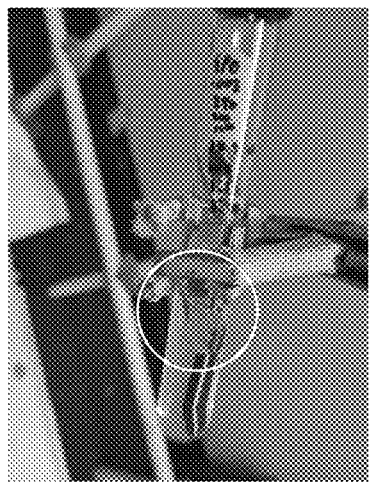
FIG. 8 is a photograph of a biphasic bottle screening test with a brine phase of 200 ppm calcium chloride ($CaCl_2$) and a pH of 8.01 ($NaHCO_3^-$) and an organic phase of 1:20 tetra acid (in xylene in a 50/50 vol. % ratio showing a clear oil and clear water phase when 250 ppm B-PE was introduced.
Figure 9:
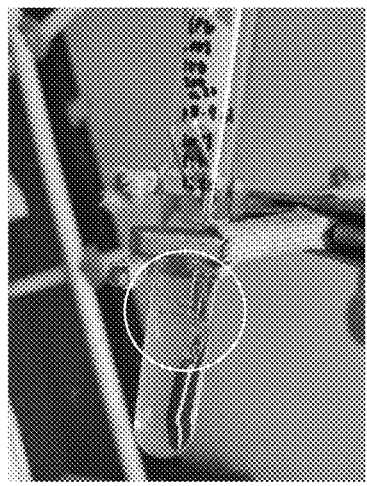
FIG. 9 is a photograph of a biphasic bottle screening test with a brine phase of 200 ppm $CaCl_2$ and a pH of 8.01 ($NaHCO_3^-$) and an organic phase of 1:20 tetra acid in xylene in a 50/50 vol. % ratio showing a clear oil and clear water phase when 100 ppm B-PE was introduced.
Figure 10:
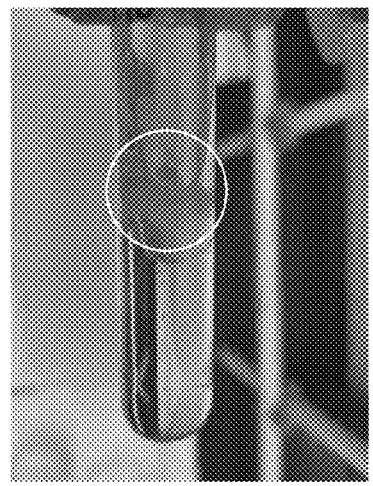
FIG. 10 is a photograph of a biphasic bottle screening test with a brine phase of 100 ppm $CaCl_2$ and a pH of 8.01 ($NaHCO_3^-$) and an organic phase of 1:20 tetra acid in in xylene a 50/50 vol. % ratio showing CNP formation at the oil/clear interface when no PEI was introduced (blank)

Biphasic Bottle Screening Tests were conducted where the aqueous phase was a brine of 200 ppm calcium chloride ($CaCl_2$) having a pH of 8.01 ($NaHCO_3^-$). The organic phase was 1:20 tetra acid in xylene in a 50/50 vol. % ratio with the brine phase. FIG. 8 is a photograph showing a clear oil and clear water phase when 250 ppm of B-PE was introduced. FIG. 9 is a photograph showing a clear oil and clear water phase when 100 ppm B-PE was introduced. Experiments were also conducted at 50 ppm PEI and 25 ppm PEI and in each of those experiments, the interface was clear of CNP. In contrast, FIG. 10 is a photograph showing CNP formation at the oil/clear interface when no PEI was introduced (blank). Thus, these Examples demonstrate that a B-PE dosage from 25 ppm to 250 ppm was effective at preventing CNP formation at these conditions.

Figure 11:
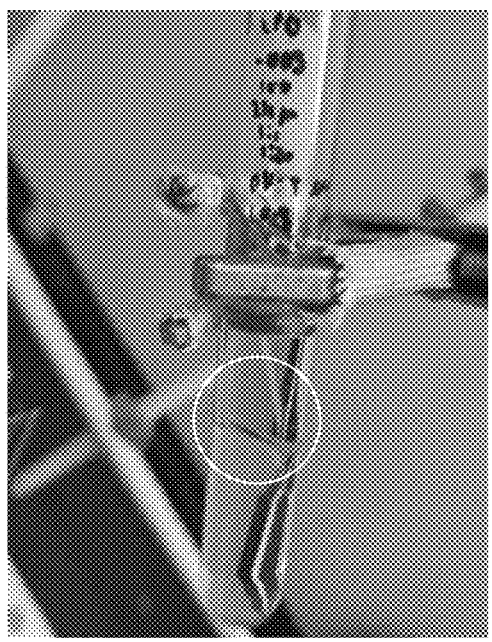
FIG. 11 is a photograph of a biphasic bottle screening test with a field synthetic brine phase of 2000 ppm $CaCl_2$ and a pH of 8.04 and an organic phase of 1:20 tetra acid in xylene in a 50/50 vol. % ratio showing a clear oil and clear water phase when 100 ppm B-PE was introduced.
Figure 12:
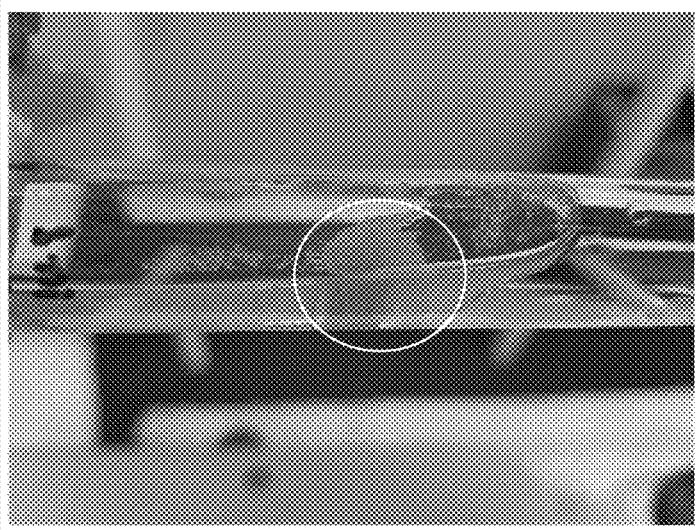
FIG. 12 is a photograph of a biphasic bottle screening test with a field synthetic brine phase of 2000 ppm $CaCl_2$ and a pH of 8.04 and an organic phase of 1:20 tetra acid in xylene in a 50/50 vol. % ratio showing CNP formation at the oil/clear interface when no PEI was introduced (blank)

In FIGS. 11-12, a field synthetic brine phase of 2000 ppm $CaCl_2$ and a pH of 8.04 was used together with an organic phase of 1:20 tetra acid in xylene in a 50/50 vol. % ratio. FIG. 11 is a photograph of a biphasic bottle screening test with showing a clear oil and clear water phase when 100 of ppm B-PE was introduced; FIG. 12 is a photograph of a blank biphasic bottle screening test with the same field synthetic brine phase showing CNP formation at the oil/clear interface.

Figure 13:
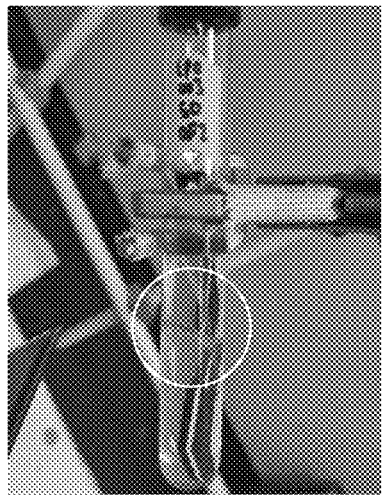
FIG. 13 is a photograph of a biphasic bottle screening test with a field synthetic brine phase of 1000 ppm $CaCl_2$ and a pH of 7.0 ($NaHCO_3^-$) and an organic phase of 1:20 tetra acid in xylene in a 50/50 vol. % ratio showing a clear oil and clear water phase when 50 ppm B-PE was introduced.
Figure 14:
FIG. 14 is a photograph of a biphasic bottle screening test with a field synthetic brine phase of 1000 ppm $CaCl_2$ and a pH of 7.0 ($NaHCO_3^-$) and an organic phase of 1:20 tetra acid in xylene in a 50/50 vol. % ratio showing a slight amount of small amount of small, loose CNP after 25 ppm B-PE was introduced.
Figure 15:
FIG. 15 is a photograph of a biphasic bottle screening test with a field synthetic brine phase of 1000 ppm $CaCl_2$ and a pH of 7.0 ($NaHCO_3^-$) and an organic phase of 1:20 tetra acid in xylene in a 50/50 vol. % ratio showing CNP formation at the oil/water interface when no PEI was introduced (blank)

In FIGS. 13-15, a field synthetic brine phase of 1000 ppm $CaCl_2$ and a pH of 7.0 were used together with an organic phase of 1:20 tetra acid in xylene in a 50/50 vol. % ratio. FIG. 13 is a photograph of a biphasic bottle screening test showing a clear oil and clear water phase when 50 ppm of B-PE was introduced. FIG. 14 is a photograph showing a slight amount of small, loose CNP after 25 ppm of B-PE was introduced. FIG. 15 is a photograph showing CNP formation at the oil/water interface when no PEI was introduced (blank).

Figure 16:
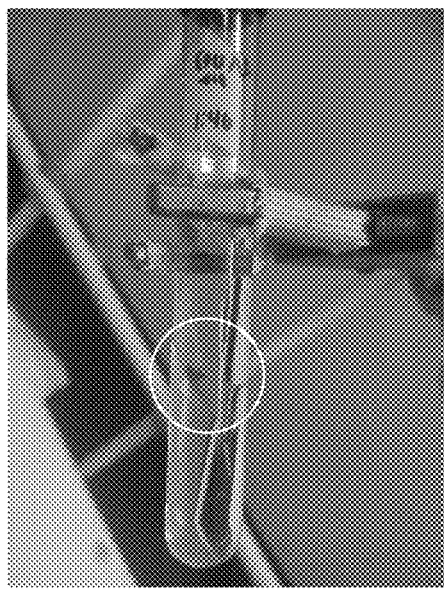
FIG. 16 is a photograph of a biphasic bottle screening test with a field synthetic brine phase of 28,000 ppm $CaCl_2$ and a pH of 8.04 ($NaHCO_3^-$) and an organic phase of 1:20 tetra acid in xylene of a 50/50 vol. % ratio organic/brine showing a clean interface when 200 ppm B-PE was introduced.
Figure 17:
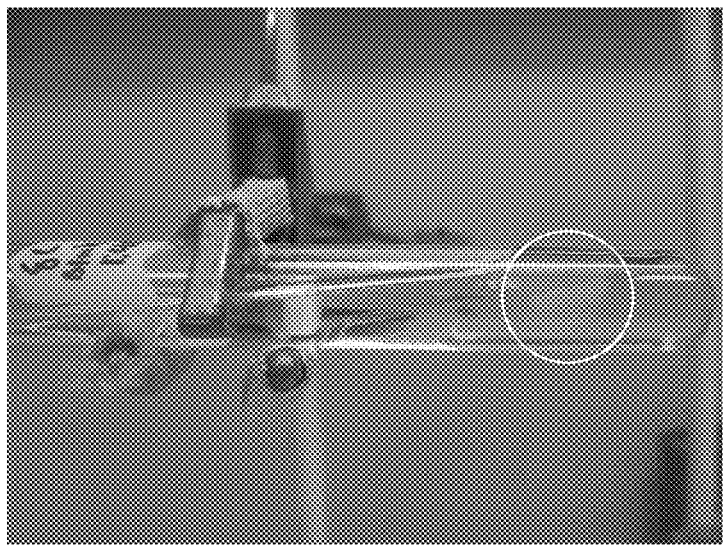
FIG. 17 is a photograph of a biphasic bottle screening test with a field synthetic brine phase of 28,000 ppm $CaCl_2$ and a pH of 8.04 ($NaHCO_3^-$) and an organic phase of 1:20 tetra acid in xylene in a 50/50 vol. % ratio showing CNP formation at the oil/water interface when no PEI was introduced (blank)

In FIGS. 16-17, a field synthetic brine phase of 28,000 ppm $CaCl_2$ and a pH of 8.04 were used together with an organic phase of 1:20 tetra acid in xylene in a 50/50 vol. % ratio. FIG. 16 is a photograph of a biphasic bottle screening test showing a clean interface after 200 ppm of B-PE was introduced. FIG. 17 is a photograph of a biphasic bottle screening test showing CNP formation at the oil/water interface when no PEI was introduced (blank).

Figure 18:
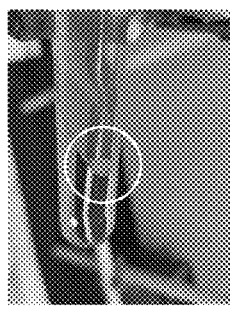
FIG. 18 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that when 100 ppm of a commercial quaternary ammonium compound was introduced there was small CNP at the interface that was less than that seen for the blank (FIG. 22)
Figure 19:
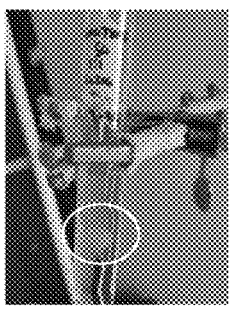
FIG. 19 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that when 50 ppm of a commercial quaternary ammonium compound was introduced increased growth in the CNP was shown at the interface as compared with FIG. 18.
Figure 20:
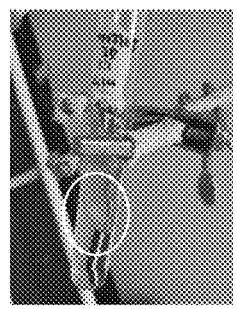
FIG. 20 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that when 25 ppm of a commercial quaternary ammonium compound was introduced that the CNP amount was similar to that seen for the blank (FIG. 22)
Figure 21:
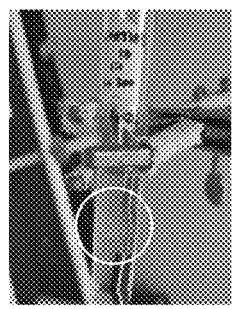
FIG. 21 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that when 10 ppm of a commercial quaternary ammonium compound was introduced that the CNP amount was similar to that seen for the blank (FIG. 22)
Figure 22:
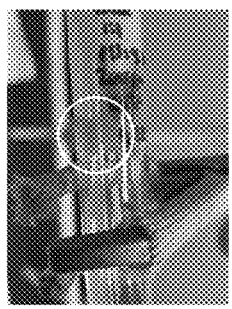
FIG. 22 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that with 10 ppm of commercial product, noticeable CNP was formed when no inhibitor was introduced (the blank)

FIGS. 18-22 are photographs of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing using an incumbent, commercial non-acid quaternary ammonium compound inhibitor. FIG. 18 shows that when 100 ppm of the quaternary ammonium compound was introduced, a small amount of CNP at the interface was formed, which amount was less than that seen for the blank (FIG. 20). FIG. 19 shows that when 50 ppm of the commercial quaternary ammonium compound was introduced, increased growth in the CNP was shown at the interface as compared with FIG. 18. FIG. 20 shows that when 25 ppm of a commercial quaternary ammonium compound was introduced that the CNP amount was similar to that seen for the blank (FIG. 22). FIG. 21 shows that when 10 ppm of a commercial quaternary ammonium compound was introduced that the CNP amount was also similar to that seen for the blank (FIG. 22).

FIGS. 23-28 used a Field Synthetic Brine Composition having a pH of 7.42 and the following composition of Table I.

TABLE I

Well Fluid Brine Composition, pH = 7.42

| | 0.5 Liters (grams of salt) |
|---|---|
| Anion Water | |
| $NaHCO_3^-$ | 0.571 |
| $Na_2SO_4$ | 0.00 |
| NaCl | 45.471 |
| Cation Water | |
| NaCl | 24.485 |
| KCl | 0.486 |
| $MgCl_2 \cdot 6H_2O$ | 7.612 |
| $CaCl_2 \cdot 2H_2O$ | 9.427 |
| $SrCl_2 \cdot 6H_2O$ | 0.487 |
| $BaCl_2 \cdot 2H_2O$ | 0.66 |

Figure 23:
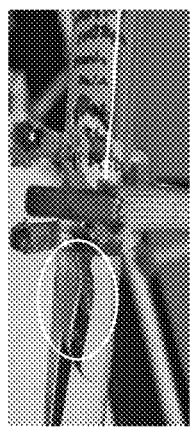
FIG. 23 is a photograph of a biphasic bottle screening test using a synthetic brine representative of the brine of a producing field showing that when 100 ppm of a commercial quaternary ammonium compound was introduced that CNP was formed but less than in the blanks (FIGS. 27 and 28)
Figure 24:
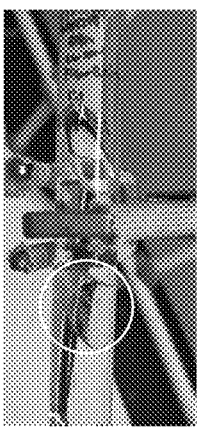
FIG. 24 is a photograph of a biphasic bottle screening test using Premier Oil Synthetic Brine showing that when 50 ppm of a commercial quaternary ammonium compound was introduced that CNP was formed.
Figure 25:
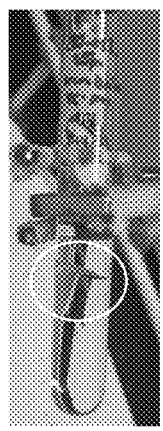
FIG. 25 is a photograph of a biphasic bottle screening test using Premier Oil Synthetic Brine showing that when 25 ppm of B-PE was introduced that no precipitate was formed.
Figure 26:
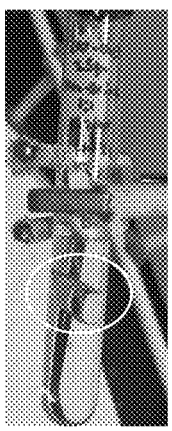
FIG. 26 is a photograph of a biphasic bottle screening test using Premier Oil Synthetic Brine showing that when 2.5 ppm of B-PE was introduced that no precipitate was formed.
Figure 27:
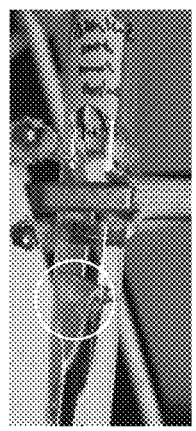
FIGS. 27 and 28 are photographs of a biphasic bottle screening test using Premier Oil Synthetic Brine showing that when no inhibitor was introduced that CNP formed.
Figure 28:
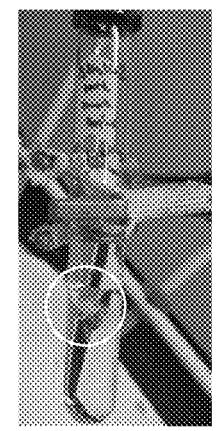

FIG. 23 is a photograph of a biphasic bottle screening test showing that when 100 ppm of a commercial quaternary ammonium compound was introduced that CNP was formed but less than in the blanks (FIGS. 27 and 28). FIG. 24 is a photograph showing that when 50 ppm of a commercial quaternary ammonium compound was introduced that CNP formed. FIG. 25 is a photograph showing that when 25 ppm of 600 g/mol B-PE was introduced that no precipitate was formed. FIG. 26 is a photograph showing that when 2.5 ppm of 300 g/mol B-PE was introduced that no precipitate was formed. FIGS. 27 and 28 are photographs showing that when no inhibitor was introduced that CNP formed. These Examples demonstrate that when amounts of B-PE that were lower than the amounts of commercial quaternary ammonium compound was used that no CNP was formed and thus the results are better, where the fluid is otherwise identical.

Figure 29:
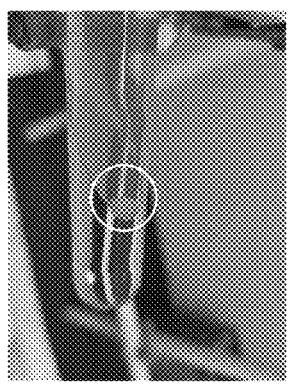
FIG. 29 is a photograph of a biphasic bottle screening test with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine showing that when 100 ppm of a commercial quaternary ammonium compound was introduced that CNP formed.
Figure 30:
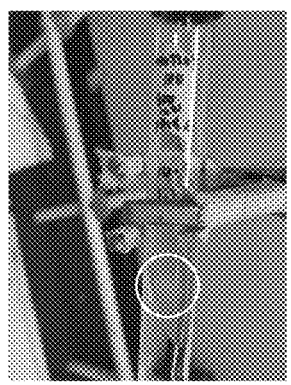
FIG. 30 is a photograph of a biphasic bottle screening test with a field synthetic brine phase of 500 ppm $CaCl_2$ and a pH of 8.01 ($NaHCO_3^-$) and an organic phase of 1:20 tetra acid in xylene of a 50/50 vol. % ratio organic/brine showing that when 100 ppm of a commercial quaternary ammonium compound was introduced that CNP formed.
Figure 31:
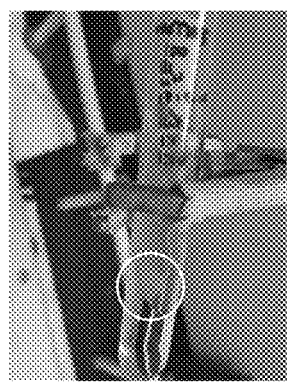
FIG. 31 is a photograph of a biphasic bottle screening test with a field synthetic brine phase of 1000 ppm $CaCl_2$ and a pH of 8.01 ($NaHCO_3^-$) and an organic phase of 1:20 tetra acid in xylene of a 50/50 vol. % ratio organic/brine showing that when 100 ppm of a commercial quaternary ammonium compound was introduced that the CNP that formed had increased density as compared with that of FIG. 30.
Figure 32:
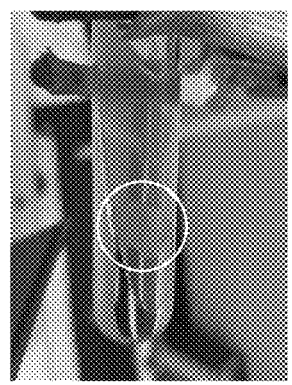
FIG. 32 is a photograph of a biphasic bottle screening test with a field synthetic brine phase of 2000 ppm $CaCl_2$ and a pH of 8.01 ($NaHCO_3^-$) and an organic phase of 1:20 tetra acid in xylene of a 50/50 vol. % ratio organic/brine showing that when 100 ppm of a commercial quaternary ammonium compound was introduced that the CNP that formed had increased density and size as compared with that of FIG. 31.

FIGS. 29-32 are photographs of biphasic bottle screening tests with a field synthetic brine phase of 200 ppm $CaCl_2$ and a pH of 8.01 ($NaHCO_3^-$) and an organic phase of 1:20 tetra acid in xylene of a 50/50 vol. % ratio organic/brine demonstrating that performance of this commercial inhibitor decreases as the amount of calcium in the fluid increases. Specifically, FIG. 29 shows that when 100 ppm of a commercial quaternary ammonium compound was introduced that CNP formed. FIG. 30 shows that when 100 ppm of the commercial quaternary ammonium compound was introduced that CNP formed. FIG. 31 shows that when 100 ppm of the commercial quaternary ammonium compound was introduced that the CNP that formed had increased density as compared with that of FIG. 30. FIG. 32 shows that when 100 ppm of a commercial quaternary ammonium compound was introduced that the CNP that formed had increased density and size as compared with that of FIG. 31.

FIGS. 33-36 are photographs of a biphasic bottle screening test with a field synthetic brine phase of varying amounts of $CaCl_2$ and a pH of 8.01 ($NaHCO_3^-$) and an organic phase of 1:20 tetra acid in xylene of a 50/50 vol. % ratio organic/brine which demonstrate that B-PE performance was not affected by increasing calcium concentration. More specifically, FIG. 33 is a photograph showing that when 50 ppm of B-PE was introduced to a fluid containing 200 ppm of calcium that oil/water interface was clean. FIG. 34 is a photograph showing that when 50 ppm of B-PE was introduced to a fluid containing 1000 ppm of calcium that oil/water interface was clean. FIG. 35 is a photograph showing that when 100 ppm of B-PE was introduced to a fluid containing 2000 ppm of calcium that oil/water interface was clean. FIG. 36 is a photograph showing that when no PEI was introduced (blank) that to a fluid containing 2000 ppm of calcium naphthenate precipitate formed at the oil/water interface. With FIG. 35 illustrates that at a constant concentration of "100 ppm" of PEI and increasing calcium concentration from 200 to 2000 ppm calcium, B-PE performance is not affected by increasing calcium concentration.

Figure 37:
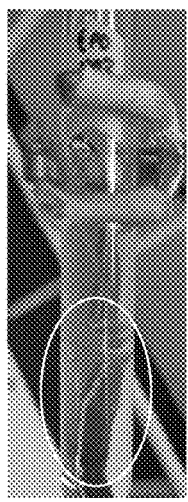
FIG. 37 is a photograph of a biphasic bottle screening test with a field synthetic brine phase of 200 ppm $CaCl_2$ and a pH of 8.04 ($NaHCO_3^-$) and an organic phase of 1:20 tetra acid in xylene of a 50/50 vol. % ratio organic/brine showing that when 100 ppm of a 300 mol. wt. B-PE was introduced that oil/water interface was free of solids.
Figure 38:
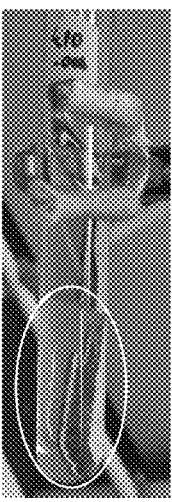
FIG. 38 is a photograph of a biphasic bottle screening test with a field synthetic brine phase of 200 ppm $CaCl_2$ and a pH of 8.04 ($NaHCO_3^-$) and an organic phase of 1:20 tetra acid in xylene of a 50/50 vol. % ratio organic/brine showing that when 100 ppm of a 600 mol. wt. B-PE was introduced that oil/water interface was free of solids.
Figure 39:
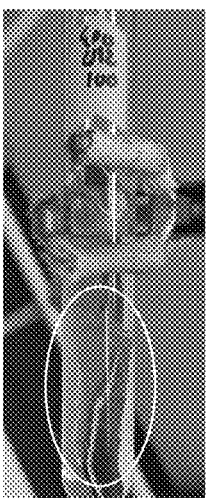
FIG. 39 is a photograph of a biphasic bottle screening test with a field synthetic brine phase of 200 ppm $CaCl_2$ and a pH of 8.04 ($NaHCO_3^-$) and an organic phase of 1:20 tetra acid in xylene of a 50/50 vol. % ratio organic/brine showing that when 100 ppm of a 1200 mol. wt. B-PE was introduced that oil/water interface was free of solids.
Figure 40:
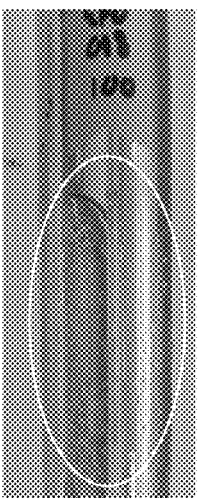
FIG. 40 is a photograph of a biphasic bottle screening test with a field synthetic brine phase of 200 ppm $CaCl_2$ and a pH of 8.04 ($NaHCO_3^-$) and an organic phase of 1:20 tetra acid in xylene of a 50/50 vol. % ratio organic/brine showing that when 100 ppm of a 1800 mol. wt. B-PE was introduced that calcium naphthenate precipitate was dispersed in the aqueous phase.
Figure 41:
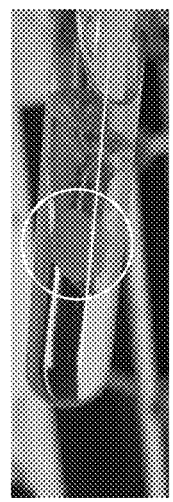
FIGS. 41 and 42 are photographs of a biphasic bottle screening test with a field synthetic brine phase of 200 ppm $CaCl_2$ and a pH of 8.04 ($NaHCO_3^-$) and an organic phase of 1:20 tetra acid in xylene of a 50/50 vol. % ratio organic/brine showing that when no PEI was introduced that CNP was formed at the oil/water interface.
Figure 42:
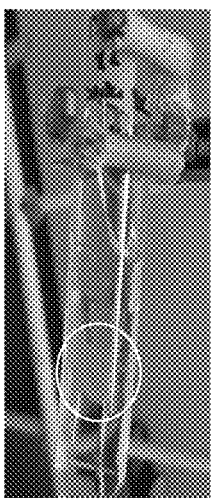

FIGS. 37-42 are photographs of a biphasic bottle screening test with a field synthetic brine phase of 200 ppm $CaCl_2$ and a pH of 8.04 ($NaHCO_3^-$) and an organic phase of 1:20 tetra acid in xylene of a 50/50 vol. % ratio organic/brine showing B-PE molecular weight makes a difference. FIG. 37 shows that when 100 ppm of a 300 mol. wt. B-PE was introduced that oil/water interface was free of solids. FIG. 38 shows that when 100 ppm of a 600 mol. wt. B-PE was introduced that oil/water interface was free of solids. FIG. 39 shows that when 100 ppm of a 1200 mol. wt. B-PE was introduced that oil/water interface was free of solids. FIG. 40 shows that when 100 ppm of a 1800 mol. wt. branched PEI was introduced that CNP was dispersed in the aqueous phase. FIGS. 41 and 42 are photographs of a biphasic bottle screening test showing that when no PEI was introduced that CNP formed at the oil/water interface.

In the foregoing specification, the invention has been described with reference to specific embodiments thereof, and has been demonstrated as effective in providing methods and compositions for inhibiting the formation of CNP in a fluid that comprises an aqueous phase and an organic phase, where the fluid also comprising calcium and tetra acid. However, it will be evident that various modifications and changes can be made thereto without departing from the broader scope of the invention as set forth in the appended claims. Accordingly, the specification is to be regarded in an illustrative rather than a restrictive sense. For example, specific basic compounds, branched PEIs, monocations, dications, metal naphthenates, alkali metals, alkali earth metals, aqueous phases, organic phases falling within the claimed parameters, but not specifically identified or tried in a particular composition or method or proportion or conditions, are expected to be within the scope of this invention.

The words "comprising" and "comprises" as used throughout the claims is interpreted as "including but not limited to".

The present invention may suitably comprise, consist or consist essentially of the elements disclosed and may be practiced in the absence of an element not disclosed. For instance, in a method for inhibiting the formation of metal naphthenate in a fluid that comprises an aqueous phase and an organic phase, where the fluid also comprising metal cations and tetra acid, the method may consist essentially of or consist of contacting the fluid with an amount of a branched polyethyleneimine (B-PE) effective to inhibit the formation of calcium naphthenate in the fluid, where the B-PE has a weight average molecular weight in a range from 150-2000 g/mol, and inhibiting the formation of metal naphthenate in the fluid.

Alternatively, in a treated fluid composition, the treated fluid may consist essentially of or consist of an aqueous phase comprising metal cations, an organic phase comprising tetra acid, and a branched polyethyleneimine (B-PE) effective to inhibit the formation of metal naphthenate in the treated fluid, where the B-PE has a molecular weight in a range from 150-2000 g/mol.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for preventing the formation of metal naphthenate solids in a fluid that comprises an aqueous phase and an organic phase, where the fluid also comprises metal cations and tetra acid, the method comprising:
    contacting the fluid with an amount of a branched polyethyleneimine (B-PE) effective to prevent the formation of metal naphthenate solids in the fluid, where the B-PE has a weight average molecular weight in a range from 150-2000 g/mol, where the aqueous phase has a pH in the range of about 5.49 to about 7.0, and where the fluid comprises tetra acid of 4-protic carboxylic acids containing 4-8 unsaturated sites;
    determining the effective amount from the amount of tetra acid present in the fluid and from the pH; and
    preventing the formation of metal naphthenate solids in the fluid.

2. The method of claim 1 where the metal cations are selected from the group consisting of metal dications, metal monocations, and combinations thereof.

3. The method of claim 2 where the metal cations are selected from the group consisting of sodium, potassium, magnesium, calcium, strontium, vanadium, barium, and combinations thereof.

4. The method of claim 1 where preventing the formation of metal naphthenate solids in the fluid is independent of the amount of calcium present in the aqueous fluid.

5. The method of claim 1 where the effective amount of the B-PE ranges from about 2.5 ppm to about 50 ppm in weight relative to the weight of the tetra acid present.

6. The method of claim 5 where the organic phase comprises crude oil.

7. The method of claim 1 where the fluid comprises an emulsion.

8. The method of claim 1 where the B-PE has a weight average molecular weight in a range from 200-2000 g/mol.

9. The method of claim 1 where the B-PE is introduced into the organic phase.

10. The method of claim 1 where the metal naphthenate solids are calcium naphthenate solids and where the metal cations comprise calcium cation.

11. A method for preventing the formation of metal naphthenate solids in a fluid that comprises an aqueous phase and an organic phase, where the fluid also comprises metal cations and tetra acid, the method comprising:
    contacting the fluid with an amount of a branched polyethyleneimine (B-PE) effective to prevent the formation of metal naphthenate solids in the fluid, where the B-PE has a weight average molecular weight in a range from 150-2000 g/mol, where the effective amount of the B-PE ranges from about 2.5 ppm to about 50 ppm in weight relative to the weight of the tetra acid present, where the pH of the aqueous phase is in the range of about 5.49 to about 7.0, and where the fluid comprises tetra acid of 4-protic carboxylic acids containing 4-8 unsaturated sites;
    determining the effective amount from the amount of tetra acid present in the fluid and from the pH; and
    preventing the formation of metal naphthenate solids in the fluid;
    where the metal cations are selected from the group consisting of sodium, potassium, magnesium, calcium, strontium, vanadium, barium, and combinations thereof.

12. The method of claim 11 where the fluid comprises an emulsion.

13. The method of claim 11 where the metal naphthenate solids are calcium naphthenate solids and where the metal cations comprise calcium cation.

* * * * *